(12) United States Patent
Caron et al.

(10) Patent No.: US 12,130,197 B2
(45) Date of Patent: Oct. 29, 2024

(54) OPTICAL FIBER ENDFACE INSPECTION MICROSCOPE HAVING A DUAL ILLUMINATION SOURCE

(71) Applicant: EXFO Inc., Quebec (CA)

(72) Inventors: Nicolas Caron, Quebec (CA); Olivier Cote, Quebec (CA); Mario L'Heureux, Levis (CA)

(73) Assignee: EXFO Inc., Quebec (CA)

( * ) Notice: Subject to any disclaimer, the term of this patent is extended or adjusted under 35 U.S.C. 154(b) by 324 days.

(21) Appl. No.: 17/455,225

(22) Filed: Nov. 17, 2021

(65) Prior Publication Data

US 2022/0170815 A1    Jun. 2, 2022

Related U.S. Application Data

(60) Provisional application No. 63/260,581, filed on Aug. 26, 2021, provisional application No. 63/118,776, filed on Nov. 27, 2020.

(51) Int. Cl.
    *G01M 11/00*      (2006.01)
    *G02B 6/38*       (2006.01)
    (Continued)

(52) U.S. Cl.
    CPC .............. *G01M 11/31* (2013.01); *G02B 6/385* (2013.01); *G02B 21/06* (2013.01); *G02B 21/365* (2013.01);
    (Continued)

(58) Field of Classification Search
    CPC ..... G01M 11/31; G02B 21/06; G02B 21/365; G02B 6/385; G02B 6/3885;
    (Continued)

(56) References Cited

U.S. PATENT DOCUMENTS

| | | |
|---|---|---|
| 10,627,310 B2 | 4/2020 | Levin et al. |
| 2014/0211200 A1* | 7/2014 | Kim ...................... G01M 11/31 356/73.1 |
| 2020/0285037 A1 | 9/2020 | Horstmeyer et al. |

OTHER PUBLICATIONS

Apr. 6, 2022, European Search Report issued for European Patent Application No. EP 21 21 0604.
(Continued)

*Primary Examiner* — Tri T Ton
(74) *Attorney, Agent, or Firm* — Helene Chotard

(57) ABSTRACT

There are provided systems and methods for inspecting an endface of an optical-fiber connector using an optical-fiber connector endface inspection microscope system comprising one or more image detectors for capturing images over the whole endface to be inspected. An illumination system comprises two or more illumination sources disposed so as to illuminate respective regions over the connector endface and to prevent dark zones in the capture images. The illumination sources are activated in sequence, such that adjacent sources are never activated at the same time, and corresponding images captured in sequence, i.e., one after the other. In this case, it is also possible to activate the illumination sources in sequence, such that adjacent sources are never activated at the same time. Activating the illumination sources separately eliminates the illumination overlap and so eliminates the double image artifact. This allows for a more uniformly lit image with less dark spots.

16 Claims, 16 Drawing Sheets

(51) Int. Cl.
  *G02B 21/06* (2006.01)
  *G02B 21/36* (2006.01)
  *G06T 7/00* (2017.01)
  *H04N 23/45* (2023.01)
  *H04N 23/74* (2023.01)

(52) U.S. Cl.
  CPC ........... G06T 7/0002 (2013.01); H04N 23/45 (2023.01); H04N 23/74 (2023.01); *G06T 2207/10056* (2013.01); *G06T 2207/10152* (2013.01)

(58) Field of Classification Search
  CPC . G06T 2207/10056; G06T 2207/10152; G06T 7/0002; H04N 23/45; H04N 23/74
  See application file for complete search history.

(56) References Cited

OTHER PUBLICATIONS

Kim, Min Young, & Lee, Seung Hyun, A Single-Lens Multi-Sensor Imaging System for 3-D Shape Inspection with a Wide Field of View, International Journal of Optomechatronics, (Nov. 6, 2012) 6:4, 350-365, DOI: 10.1080/15599612.2012.731716.
W-View Gemini Image Splitting Optics A12801-01, Technical Note (Apr. 2017) Hamamatsu Photonics K.K., Systems Division (Japan).
Hollows, Greg, Dual Magnification Dilemmas, Oemagazine [online], (Feb. 1, 2005) [retrieved on Sep. 25, 2019] Retrieved from the Internet: <URL: https://spie.org/news/dual-magnification-dilemmas?SSO=1>.

* cited by examiner

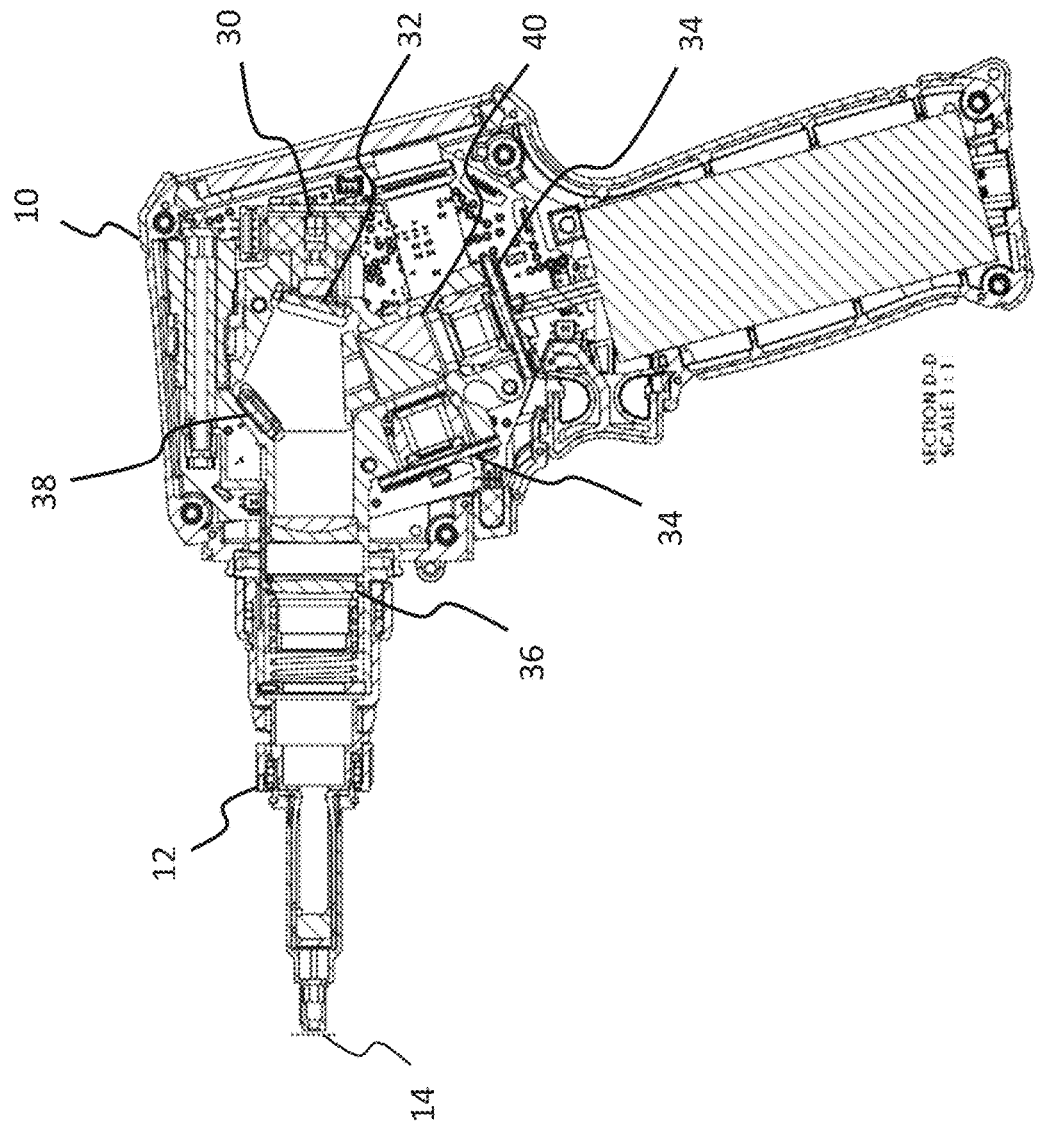
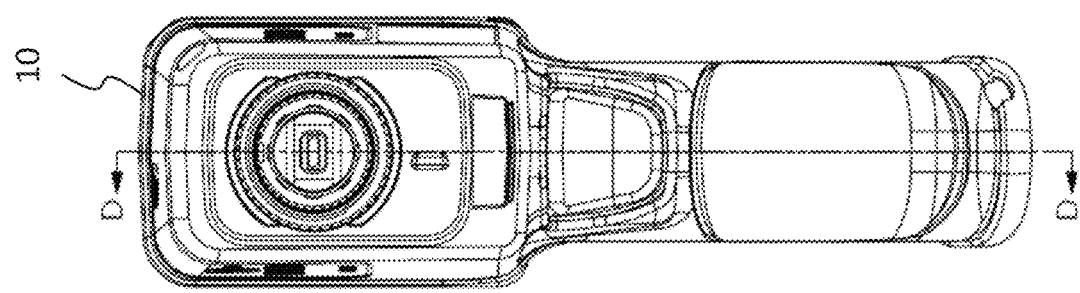
Fig. 1B
Fig. 1A

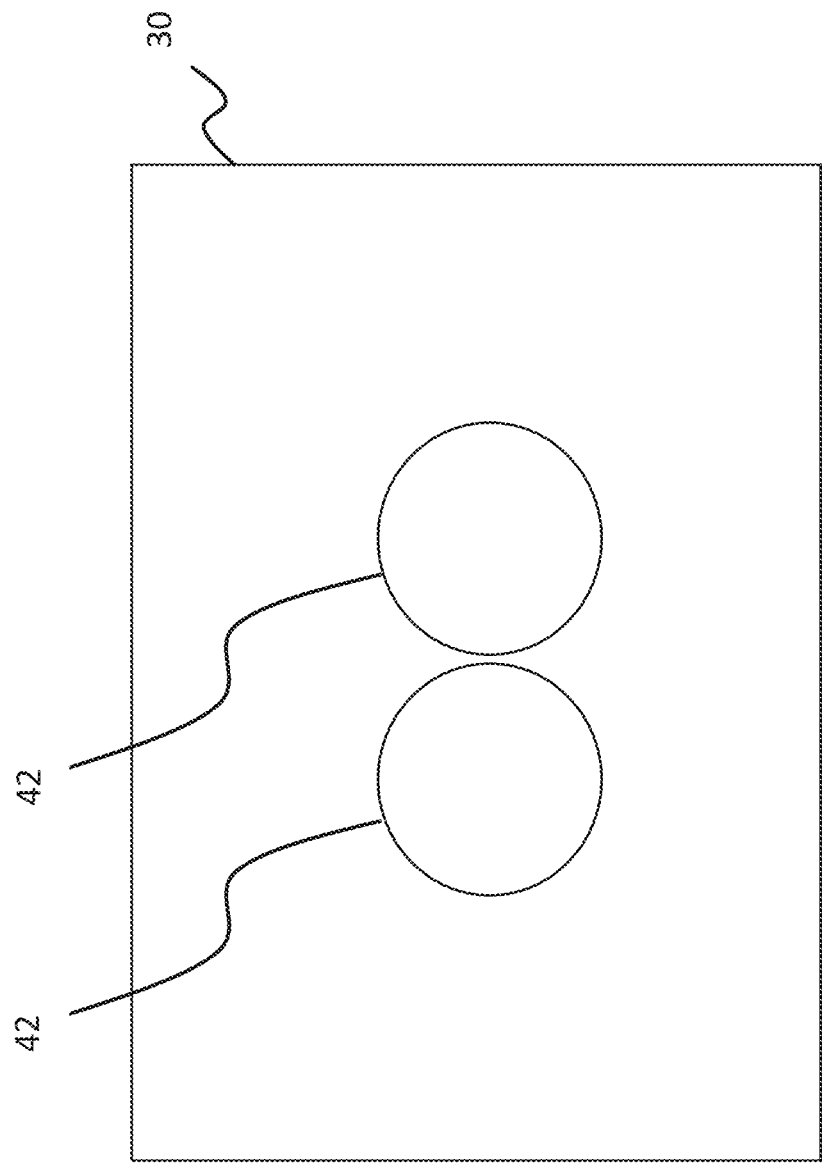

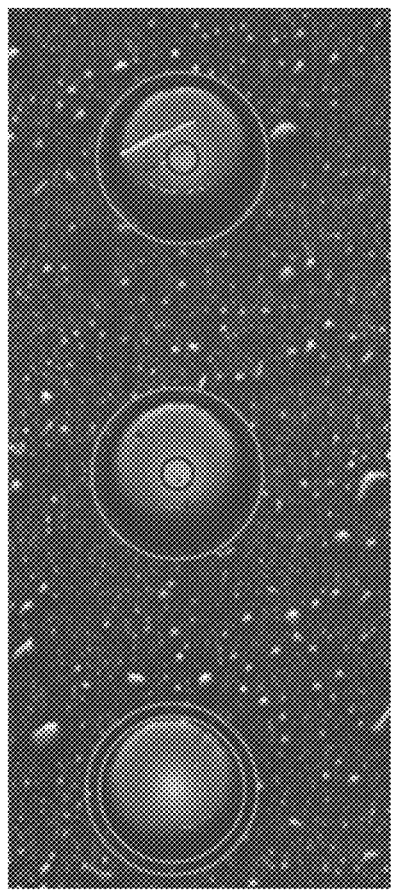
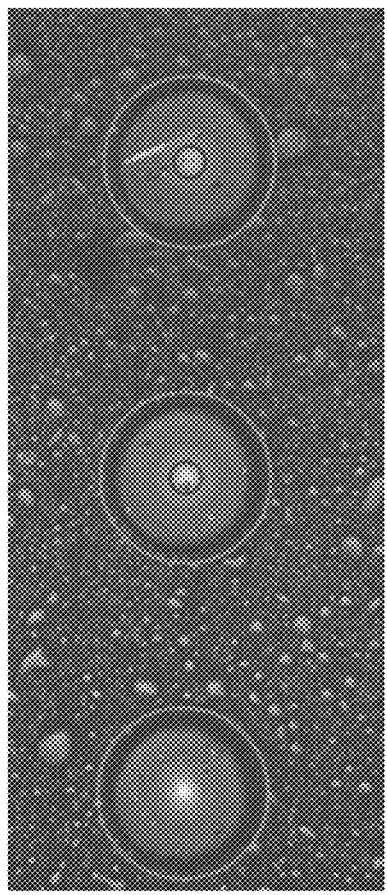
Fig. 15A
Fig. 15B

OPTICAL FIBER ENDFACE INSPECTION MICROSCOPE HAVING A DUAL ILLUMINATION SOURCE

TECHNICAL HELD

The present description generally relates to inspection of optical-fiber connector endfaces, and more particularly to optical-fiber connector endface inspection microscopes adapted to inspect mufti-fiber optical-fiber connectors.

BACKGROUND

The quality and cleanliness of endfaces of optical-fiber connectors represent important factors for achieving adequate system performance of optical communication networks. Indeed, any contamination of or damage on the mating surface of an optical-fiber connector may severely degrade signal integrity. Optical-fiber inspection microscopes are commonly employed to visually inspect and/or to analyze the optical-fiber endface of an optical-fiber connector at installation or during maintenance of optical communication networks, in order to verify the quality of the optical-fiber connection.

Some inspection microscopes are natively multi-fibers and are designed with a field-of-view allowing inspection of the whole endface of a multi-fiber connector. This large field-of-view can be obtained, e.g., by combining two image detectors, one image detector being arranged to capture an image of the right side of the endface, whereas the other image detected is arranged to capture an image of the left side of the endface. This large field-of-view is obtained by combining two image detectors.

One challenge of optical-fiber connector inspection is to be able to reliably detect small defects such as dusts and scratches over the whole region of interest on the connector endface. To do so, one of the key aspects of a reliable inspection is the illumination quality. Illumination should be intense enough, and uniformly distributed so that there are no dark zones in the image. In the case of multi-fiber connectors, the region of interest on the multi-fiber ferule is about 4.3 mm wide. Uniform illumination on such a surface causes some challenges, especially in the case of inspection microscopes that uses dual image detectors.

There therefore remains a need for properly illuminating the endface of a large-surface optical-fiber connector for high-quality endface inspection.

SUMMARY

There are provided systems and methods for inspecting an endface of an optical-fiber connector using an optical-fiber connector endface inspection microscope system comprising one or more image detectors for capturing images over the whole endface to be inspected. An illumination system comprises two or more illumination sources disposed so as to illuminate respective regions over the connector endface and to prevent dark zones in the capture images. If more than one images are captured, they may be stitched in processing to obtain a single image covering the whole region of interest over the multi-fiber connector endface.

However, when using an array of illumination sources, there may be areas in the images where illumination from multiple illumination sources overlaps. This region becomes brighter than the rest of the image, which can lead to saturation and inaccurate defect detection on the connector endface. Furthermore, the image captured under overlapping illumination can observe a double image due to mechanical imperfections in the system that cause the two images not to focalize exactly at the same position.

In order to solve the illumination issue, there is herein proposed to activate the illumination sources in sequence, such that adjacent sources are never activated at the same time and to capture corresponding images. Activating the illumination sources separately eliminates the illumination overlap and so eliminates the double image artifact. This allows for a more uniformly lit image with less dark spots.

Therefore, in accordance with one aspect, there is provided an optical-fiber connector endface inspection microscope system for inspecting an endface of an optical-fiber connector, the optical-fiber connector endface inspection microscope system comprising:

an optical-fiber connector endface inspection microscope comprising at least one image detector for capturing images of the endface to be inspected;

an illumination system comprising at least two illumination sources disposed so as to correspond to respective illumination regions over the connector endface to be inspected; and a controller configured to capture at least a first image while a first one of the illumination sources is activated and all adjacent illumination sources are deactivated; and to capture at least a second image while a second one of the illumination sources is activated and all adjacent illumination sources are deactivated.

In some embodiments, the optical-fiber connector endface inspection microscope may further comprise a processing unit configured to analyze said first and second images and, for each of a plurality of regions over the connector endface, select which image to use for endface inspection analysis.

In some embodiments, the processing unit may be configured to analyze said first and second images and, for each individual optical fiber endface, select which image to use for endface inspection analysis.

In some embodiments, the optical-fiber connector endface inspection microscope may comprise at least two image detectors, the at least two image detectors being disposed so as to capture images of respective regions over the connector endface. The controller may be configured to capture said first image using a first one of the image detectors and capture said second image using a second one of said image detectors.

In some embodiments, said first image and said second image may be direct-illumination images wherein images are captured while activating the illumination source that is the most aligned with the region being captured.

In some embodiments, the controller may be configured to further capture cross-illumination images wherein images are captured while activating an illumination source that is not the most aligned with the region being captured.

In some embodiments, the processing unit may be configured to analyze the direct-illumination images and the cross-illumination images and, for each region over the connector endface, select which image to use for endface inspection analysis.

In some embodiments, the processing unit may be configured to analyze the direct-illumination images and the cross-illumination images and, for each individual optical fiber endface, select which image to use for endface inspection analysis.

In accordance with another aspect, there is provided a method for inspecting an endface of an optical-fiber connector using an optical-fiber connector endface inspection microscope system, the method comprising:

illuminating the connector endface using an illumination system comprising at least two illumination sources disposed so as to correspond to respective illumination regions over the connector endface to be inspected; and capturing images of the connector endface to be inspected using at least one image detector, wherein at least a first image is captured while a first one of the illumination sources is activated and all adjacent illumination sources are deactivated; and at least a second image is captured while a second one of the illumination sources is activated and all adjacent illumination sources are deactivated.

In some embodiments, the method may further comprise analyzing said first and second images and, for each of a plurality of regions over the connector endface, selecting which image to use for endface inspection analysis.

In some embodiments, which image to use for endface inspection analysis may be selected for each individual optical fiber endface.

In some embodiments, the optical-fiber connector endface inspection microscope may comprise at least two image detectors disposed so as to capture images of respective regions over the connector endface. The first image is captured using a first image detector and the second image is captured using a second image detector.

In some embodiments, said first image and said second image may be direct-illumination images captured while the illumination source that is the most aligned with the region being captured is activated and all adjacent illumination sources are deactivated.

In some embodiments, a first cross-illumination image may be captured while the illumination source that is the most aligned with the first region being captured is deactivated and one other illumination source is activated; and the second cross-illumination image may be captured while the illumination source that is the most aligned with a second region being captured is deactivated and one other illumination source is activated.

In some embodiments, the method may further comprise analyzing the direct-illumination images and the cross-illumination images and, for each region over the connector endface, selecting which image to use for endface inspection analysis.

In some embodiments, the method may further comprise analyzing the direct-illumination images and the cross-illumination images and, for each individual optical fiber endface to be inspected, selecting which image to use for endface inspection analysis.

In accordance with another aspect, there is provided an optical-fiber connector endface inspection microscope system for inspecting an endface of an optical-fiber connector, the optical-fiber connector endface inspection microscope system comprising:

an optical-fiber connector endface inspection microscope comprising at least two image detectors for capturing images of the endface to be inspected, the at least two image detectors being disposed so as to capture images of respective regions over the connector endface;

an illumination system comprising at least two illumination sources disposed so as to correspond to the respective regions over the connector endface;

a controller configured to capture images from each image detector in sequence, while also activating the illumination sources in sequence such that, when capturing an image using one illumination source, all adjacent illumination sources are deactivated.

In accordance with another aspect, there is provided a method for inspecting an endface of an optical-fiber connector using an optical-fiber connector endface inspection microscope system, the method comprising:

illuminating the connector endface using an illumination system comprising at least two illumination sources disposed so as to correspond to respective regions over the connector endface;

capturing images of the connector endface to be inspected using at least two image detectors disposed so as to capture images of the respective regions over the connector endface, wherein the images are captured and the illumination sources are activated in sequence such that, when capturing an image using one illumination source, all adjacent illumination sources are deactivated.

In accordance with a further aspect, it was found that another problem arises when the optical-fiber connector ferrule is slightly tilted (e.g., due to a mechanical pressure or the weight of the connector). It was found that a croissant-like shadow may then appears in the captured images, on some optical fibers. To eliminate this issue, there is proposed to capture additional images wherein the opposite illumination source is activated (cross-illumination). For each inspected region, at least two images may then be made available to the inspection analysis software (direct-illumination and cross-illumination). For each region or for each optical fiber endface, the software selects which image to use for endface inspection analysis.

Further features and advantages of the present invention will become apparent to those of ordinary skill in the art upon reading of the following description, taken in conjunction with the appended drawings.

BRIEF DESCRIPTION OF THE DRAWINGS

FIG. 1 comprises FIG. 1A and FIG. 1B wherein FIG. 1A is a front elevation view of an optical-fiber connector endface inspection microscope system in accordance with one embodiment, and FIG. 1B is a cross-sectional view of the same, taken along line D-D of FIG. 1A.

FIG. 2 is a front view schematic of the illumination source arrangement of the inspection microscope system of FIG. 1 when looking from the object.

FIG. 15 comprises FIG. 15A and FIG. 15B wherein FIG. 15A is part of an image obtained with direct illumination and FIG. 15B is part of an image obtained with cross illumination, wherein both images show fibers 4, 5 and 6 of the same multifiber connector endface.

FIG. 16 comprises FIG. 16A, FIG. 16B and FIG. 16C; wherein

Figure 3:
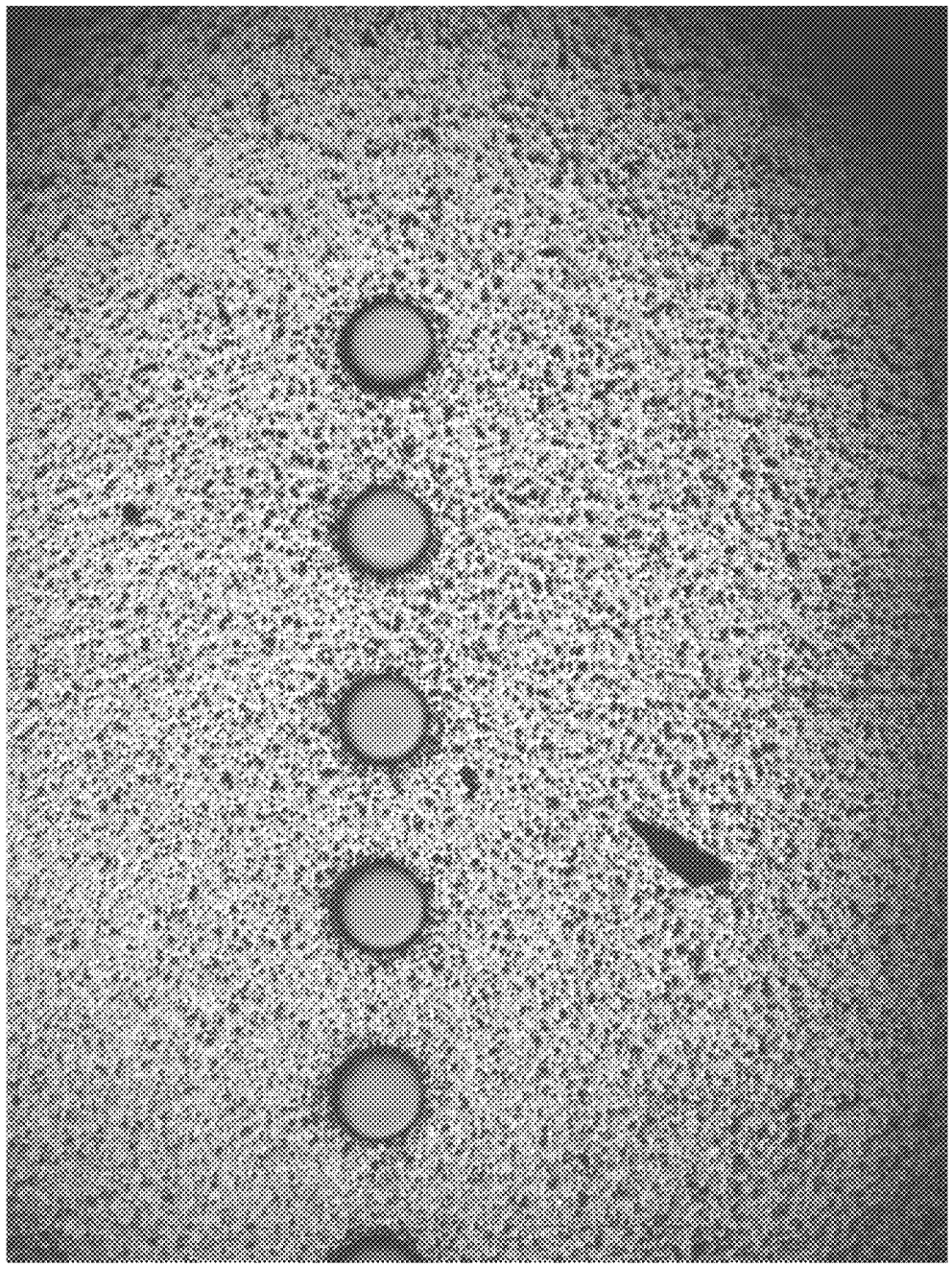
FIG. 3 is an example image of mufti-fiber connector enface showing darker zones in the four (4) corners of the image.

It will be noted that throughout the drawings, like features are identified by like reference numerals. In the following description, similar features in the drawings have been given similar reference numerals and, to not unduly encumber the figures, some elements may not be indicated on some figures if they were already identified in a preceding figure. It should be understood herein that elements of the drawings are not necessarily depicted to scale, since emphasis is placed upon clearly illustrating the elements and structures of the present embodiments. Some mechanical or other physical components may also be omitted in order to not encumber the figures.

The following description is provided to gain a comprehensive understanding of the methods, apparatus and/or systems described herein. Various changes, modifications, and equivalents of the methods, apparatuses and/or systems described herein will suggest themselves to those of ordinary skill in the art. Description of well-known functions and structures may be omitted to enhance clarity and conciseness.

Although some features may be described with respect to individual exemplary embodiments, aspects need not be limited thereto such that features from one or more exemplary embodiments may be combinable with other features from one or more exemplary embodiments.

DETAILED DESCRIPTION

Referring to FIG. 1 which comprises FIG. 1A and FIG. 1B, there is provided an optical-fiber inspection microscope system for inspecting an endface of an optical-fiber connector. The system 100 comprises a main housing structure 10 and an interchangeable optical head 12. It will be understood that the configuration of FIG. 1 illustrates one example embodiment of an optical-fiber connector endface inspection microscope system. It should be appreciated by those of ordinary skill in the art that various implementations of the inspection microscope can be envisaged as known in the art and that the embodiment illustrated herein is no way meant to be limitative.

Generally, an inspection microscope system incorporates an imaging assembly comprising an illumination source arrangement 30 for illuminating the connector endface to be inspected (not shown) lying on an object plane 14, an illumination beam splitter 32 to direct illumination light toward the connector endface, one or more image detectors 34 (herein two image detectors) for capturing at least one image of the endface to be inspected, and imaging optics. The imaging optics comprises an objective lens system (and optionally other lenses, mirrors (see, e.g., 38) and/or other optical components (e.g., beamsplitter 40) defining objective optics), for imaging the illuminated connector endface, on the image plane(s) coinciding with the image detectors 34. The object plane 14 as defined herein is determined by the objective lens system and coincides with the plane where the connector endface to be inspected (i.e., the object) should be positioned (within the focusing range of the objective lens system) to be suitably imaged on the image detectors 34. The optical path between the object plane and the image plane defines an imaging path of the inspection microscope, along which propagates the inspection light beam resulting from a reflection of illumination light on the connector endface, for optical magnification of the object (i.e., the connector endface) positioned on the object plane.

More specifically, the objective lens system may comprise a movable focusing lens 36 for adjusting a focus of the objective lens system on the image detectors 34 and may optionally comprise some fixed relay lenses. It will be understood that the objective lens system may further comprise other lenses or optical elements as required by the optical design, which lenses and optical elements can be either fixed relative to the microscope system or movable, e.g., held fixed with the focusing lens.

In the embodiment of FIG. 1, two image detectors 34 are disposed so as to capture images of respective regions over the connector endface (i.e., left and right regions of the connector endface). The light beam reflected on the inspected endface is split among the two image detectors 34 using the beamsplitter 40 and is split so as to produce an image of a left-side region of the connector endface on one image detector 34 and an image of a right-side region on the other image detector 34. This is achieved by adequately offsetting each image detectors relative to the center axis of the optical system. The two images may be stitched in processing to obtain a single image covering the whole region of interest over the mufti-fiber connector endface.

In other embodiments, it is also possible to use a single image detector to cover the whole region of interest over the multi-fiber connector endface, depending on the available technology and required image resolution.

Referring to FIG. 2, the illumination arrangement 30 of the embodiment of FIG. 1 comprises two illumination sources 42 placed along a longitudinal line of the optical fiber connector endface and disposed so as to correspond to respective illumination regions over the connector endface. The dual source illumination arrangement 30 is used to illuminate the whole area of interest and prevent dark zones in the capture images.

FIG. 3 is an example image of a mufti-fiber connector endface that is captured using an inspection microscope employing a single illumination source. As seen in FIG. 3, the image shows some darker zones in its four corners, which makes it non-optimal for inspection of the whole area of interest. The arrangement of FIG. 2 is used to solve this issue.

Figure 4:
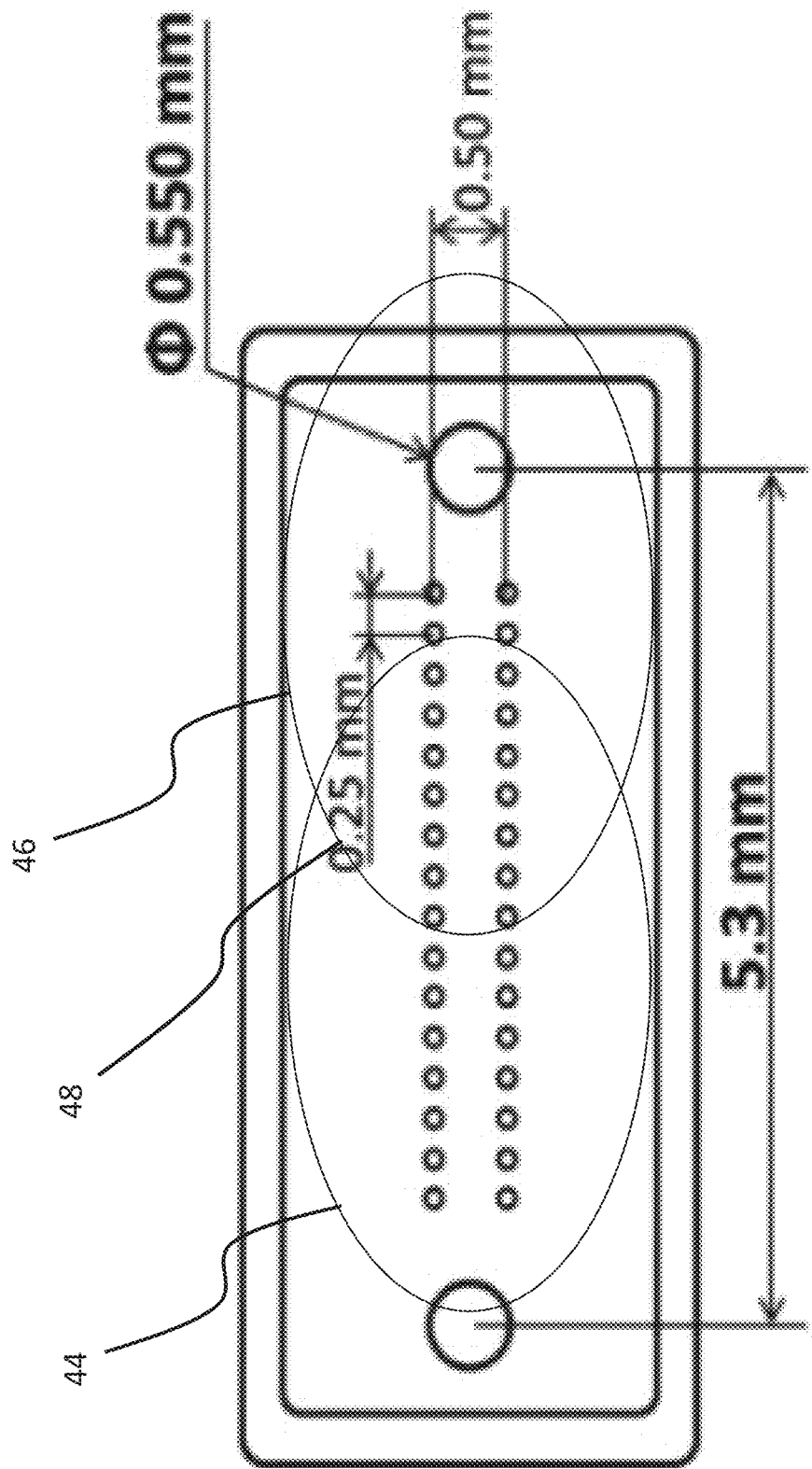
FIG. 4 is a schematic illustrating the problem of overlapping illumination zones when using two illumination sources. This figure shows that in the center of the connector the two zones overlap resulting in a non-uniformity in the connector image.

However, when using an illumination source array, two problems arise. First, referring to FIGS. 4 and 5, there is an area 48 in the image where there is an overlap between the illumination 44 of the first source and the illumination 46 of the second source. This area 48 becomes brighter than the rest of the image. This is problematic because the image captured over this region can saturate, which would impair accurate defect detection on the connector endface by either human or machine image analysis. If light is adjusted so that the center of the image does not saturate, some portions of the image become darker. Such illumination is then no better than single source illumination.

Figure 6:
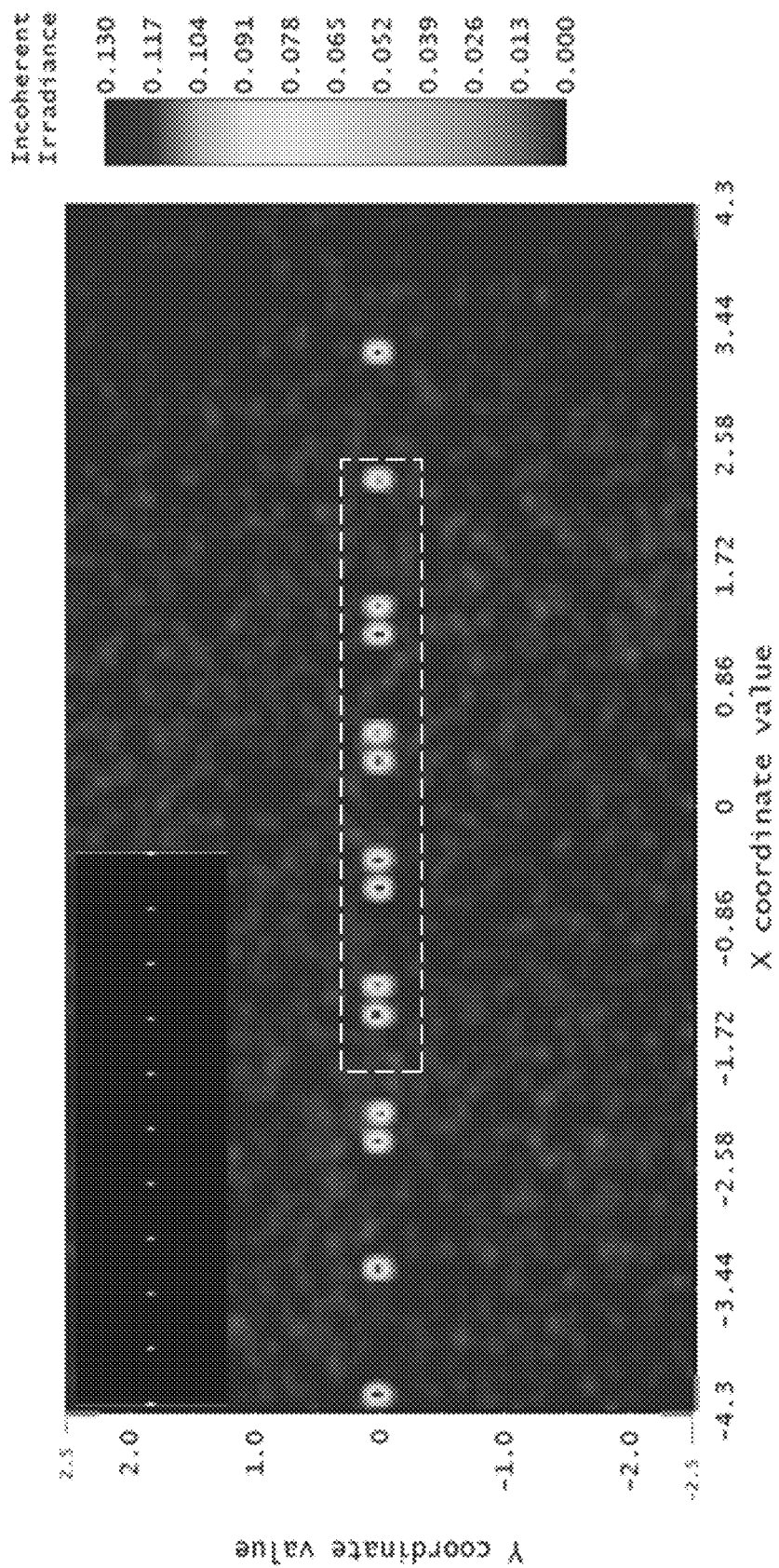
FIG. 6 is an image obtained from a simulation in software and which shows the effect of the overlapping illumination sources.

Furthermore, now referring to FIG. 6, because of specular reflections, the image captured under overlapping illumination can observe a double image, each source producing one image. FIG. 6 is an image obtained from a simulation in software and which shows the effect of the overlapping image. This image is the results of the simulation of 2 sources simultaneously illuminating the object plane. In this simulation the object is an array of points. In this image, we see that the points in the center of the image are doubled.

In theory, light beams resulting from the two illumination sources should focalize at the same point. However, due to mechanical imperfections in the system, artifacts arise by the two light beams not focalizing exactly at the same position. This creates problems in the image analysis process because it creates an ambiguity in the position of the focus, and the post-acquisition analysis must distinguish defects from two overlapping images. As can be observed in FIG. 5, it is difficult to determine which points are the real points and which are artifacts. Additionally, even under optimal focus, such artifacts are likely to impair image quality and the capability of detecting small defects.

Figure 7:
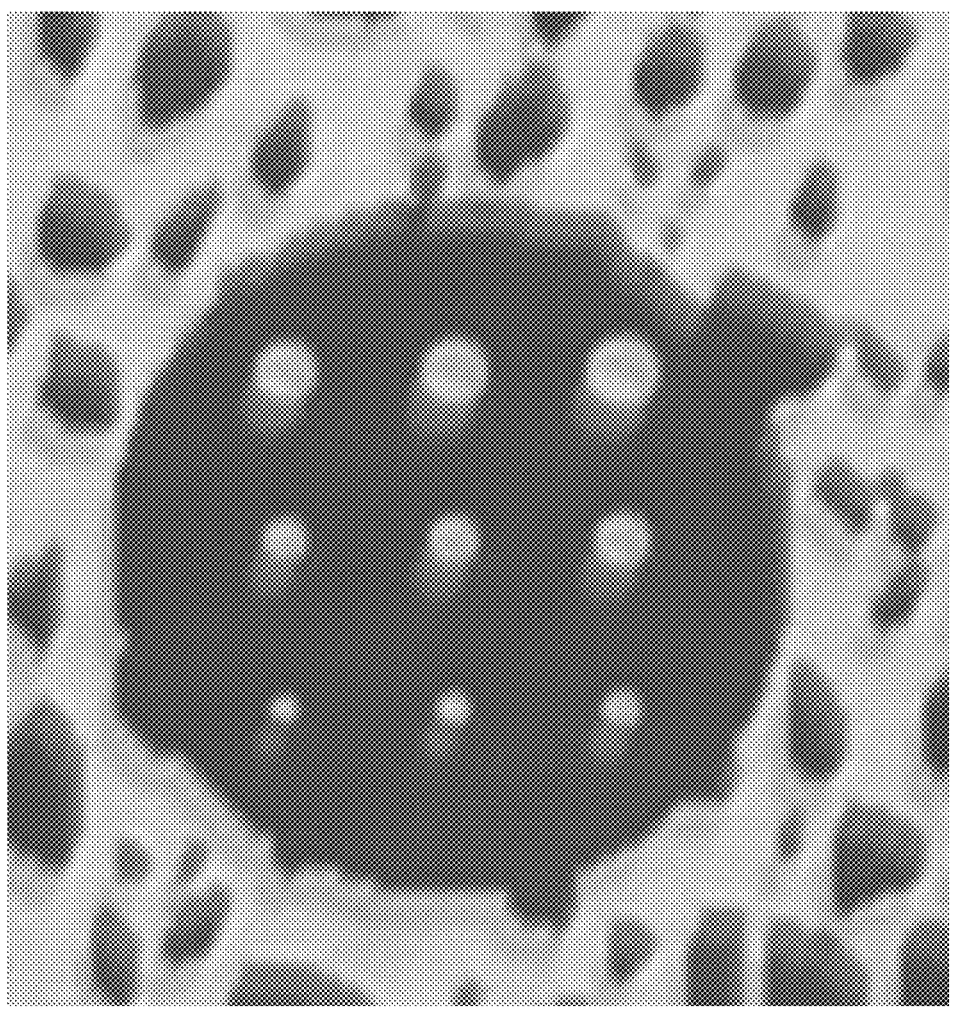
FIG. 7 is a dose-up on an image captured using an inspection microscope while activating two illumination sources and showing a double image artifact.

FIG. 7 shows a close-up on a single fiber in an image captured using an inspection microscope and which illustrates such double image artifacts obtained under overlapping illumination.

In order to solve the illumination issue, there is proposed to activate the illumination sources 42 in sequence, such that adjacent sources 42 are never activated at the same time and to capture corresponding images (left and right) in sequence, i.e., one after the other. By using the sources 42 separately, the illumination overlap is eliminated and so is the double image artifact. This allows for a more uniformly lit image with less darker spots.

Figure 9:
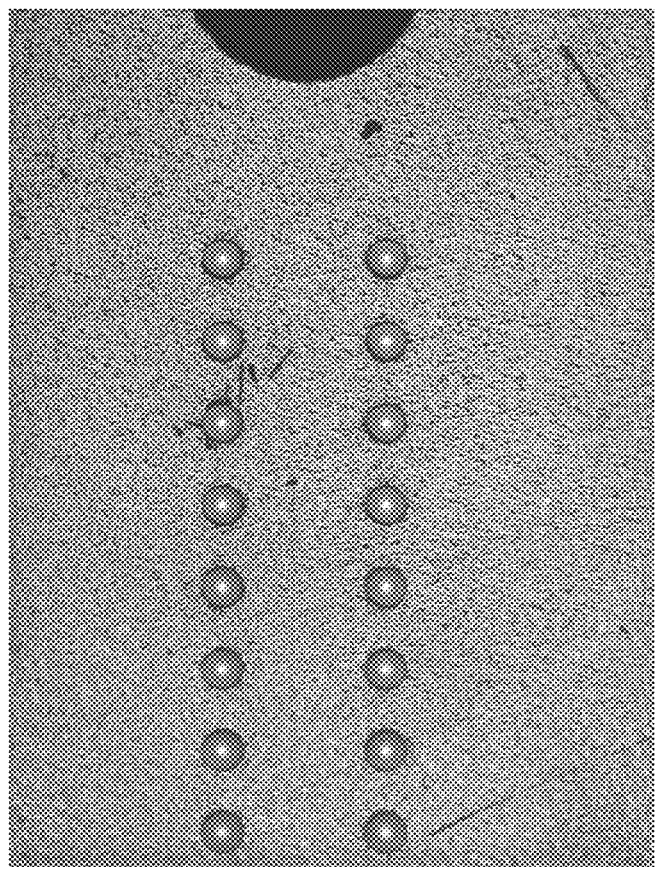
FIG. 9 is an image captured by the right-side image detector with only the right-side source activated.
Figure 8:
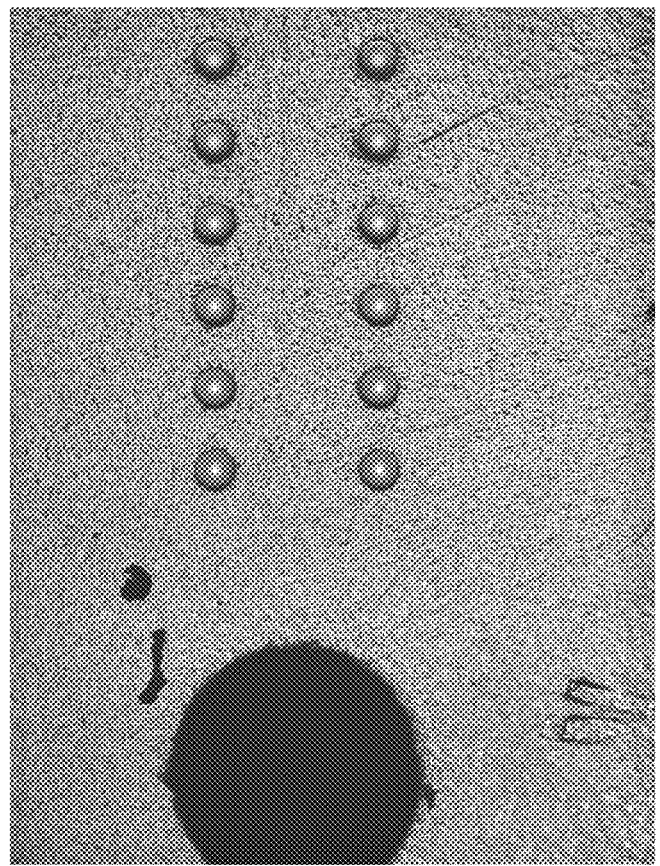
FIG. 8 is an image captured by the left-side image detector with only the left-side source activated.
Figure 10:
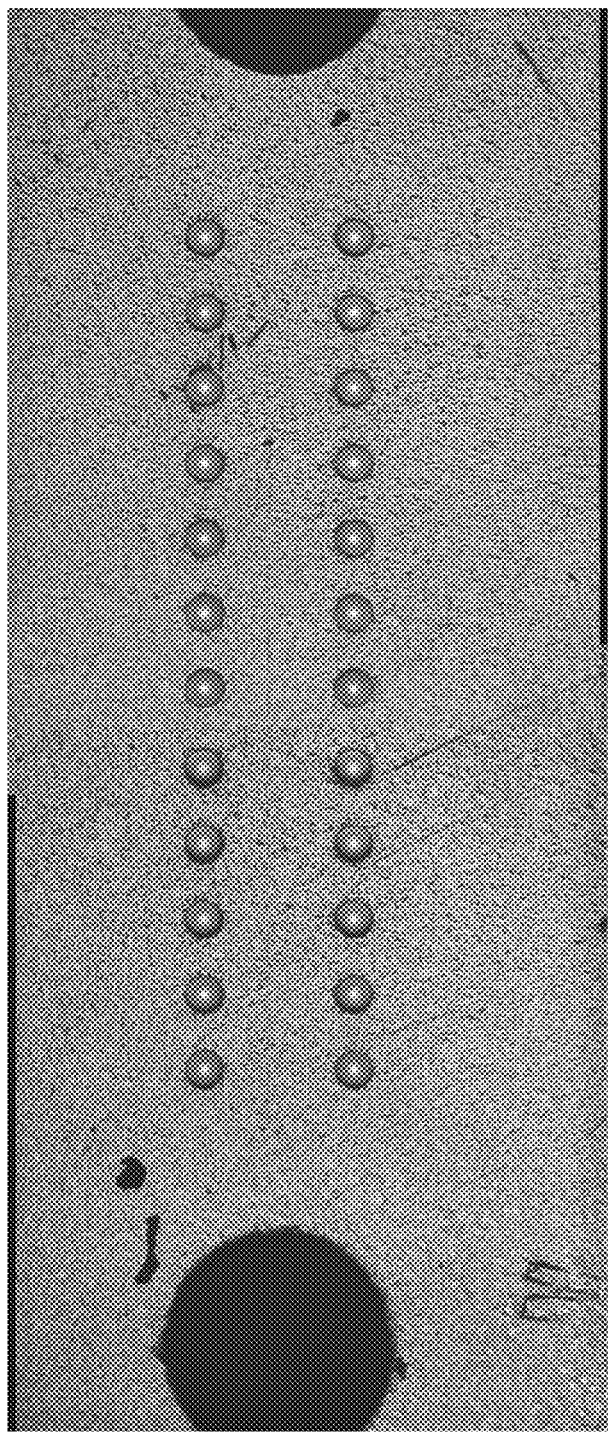
FIG. 10 is a frame obtained by stitching the images of FIGS. 8 and 9.

The image acquisition sequence captures the left-side region of the endface while the left-side source is activated and the right-side source is deactivated. FIG. 8 shows an exemplary image captured in this manner on the left-side region of a multi-fiber connector endface. The image acquisition sequence also captures the right-side region of the endface while the right-side source is activated and the left-side source is deactivated. FIG. 9 shows an exemplary image captured in this manner on the right-side region. These two images may be capture using corresponding image detectors (right and left) or using a single image detector wherein the left part of the image is kept when left-side region is illuminated, and the right part of the image is kept when right-side region is illuminated. The two images (or image parts) are then stitched in image processing to produce an image showing the whole surface of interest on the connector endface. FIG. 10 shows an exemplary frame obtained by stitching the images of FIGS. 8 and 9. Of course, the images are aligned and the overlapping portion between the two images is removed to form a single frame representing the connector endface.

Figure 11:
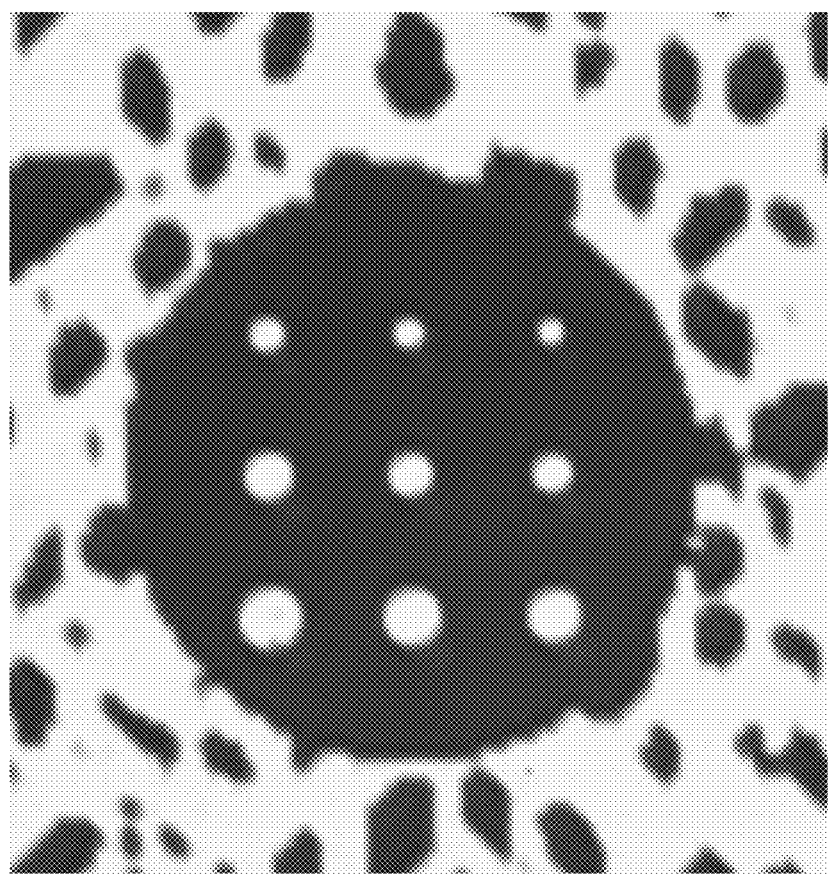
FIG. 11 is a close-up on an image captured using an inspection microscope while activating a single illumination source.

FIG. 11 shows a dose-up on a single fiber in an image captured using an inspection microscope and which illustrates how the image quality is improved when illuminating using a single source at a time, compared to the image of FIG. 7.

It should be noted that this technique can be used with any number of illumination sources, any number of image detectors, and any number of acquisitions if there are sufficient overlapping area between each captured image. If multiple sources are used, adjacent sources may be deactivated when capturing an image using one source.

Cross-Illumination

It was further found that another illumination problem may arise when the optical-fiber connector endface under inspection presents slightly tilted with respect to the expected position of the inspected endface relative to the inspection microscope. This may arise due to a mechanical pressure being applied on the inspected optical-fiber connector while engaged to the inspection microscope, or simply due to the weight of the connector creating a force that tilts the connector. When using an optical-fiber connector endface inspection microscope in the field, the connector angle can be hardly obtained. The user is an important contributor to achieving the adequate connector angle in the way he holds and maintain the inspection microscope in relatively precise position. This can become even worse in hostile environments like the top of a cell tower, e.g., 300 feet above ground in all sorts of weather conditions.

Figure 12:
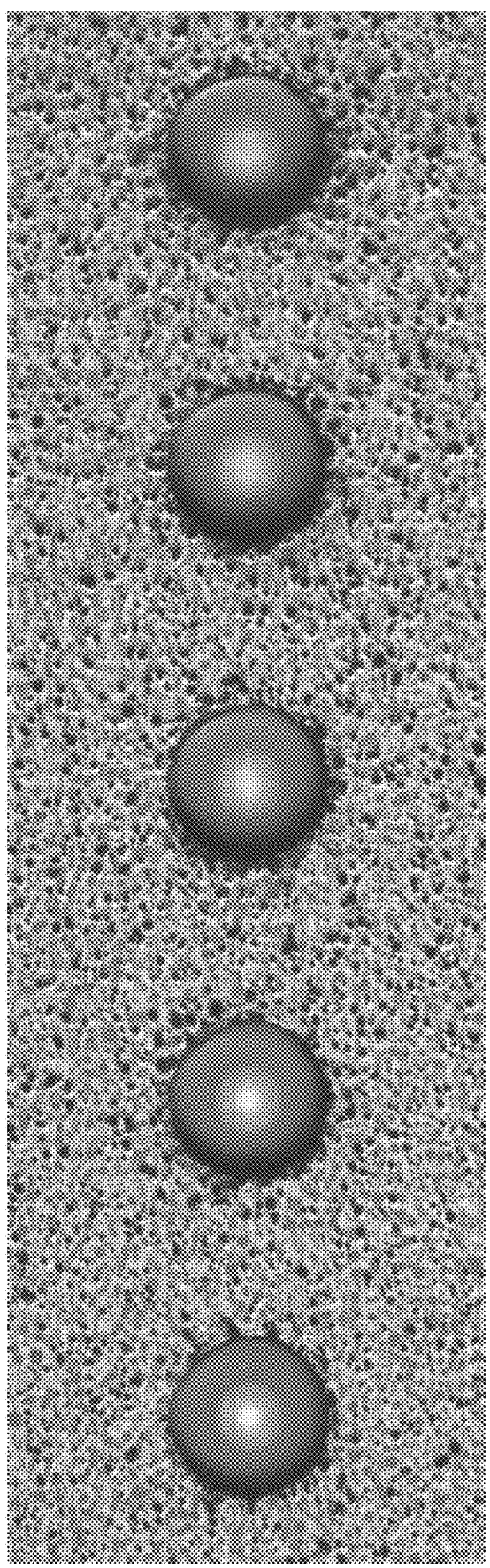
FIG. 12 is part of an image captured on a multifiber connector endface and showing a croissant-like shadow effect.

Referring to FIG. 12, it was found that under such conditions, a croissant-like shadow effect may appear in the captured images, on some optical fibers. The effect is especially visible on the optical fibers that are located close to the center of the connector endface. FIG. 12 is part of an image captured on a multifiber connector endface and which shows such a croissant-like shadow effect.

Unfortunately, typical analysis algorithms may be designed to recognize shadow areas and exclude them from the analysis. Such algorithm prevents such shadow areas to be interpreted as a large defect, which would then trigger a FAIL result. However, defects or scratches present in such shadow areas are also excluded and may therefore go unnoticed even with a visual inspection from the end-user. Both computers and humans cannot distinguish defects when they are present in a shadow area.

Figure 13:
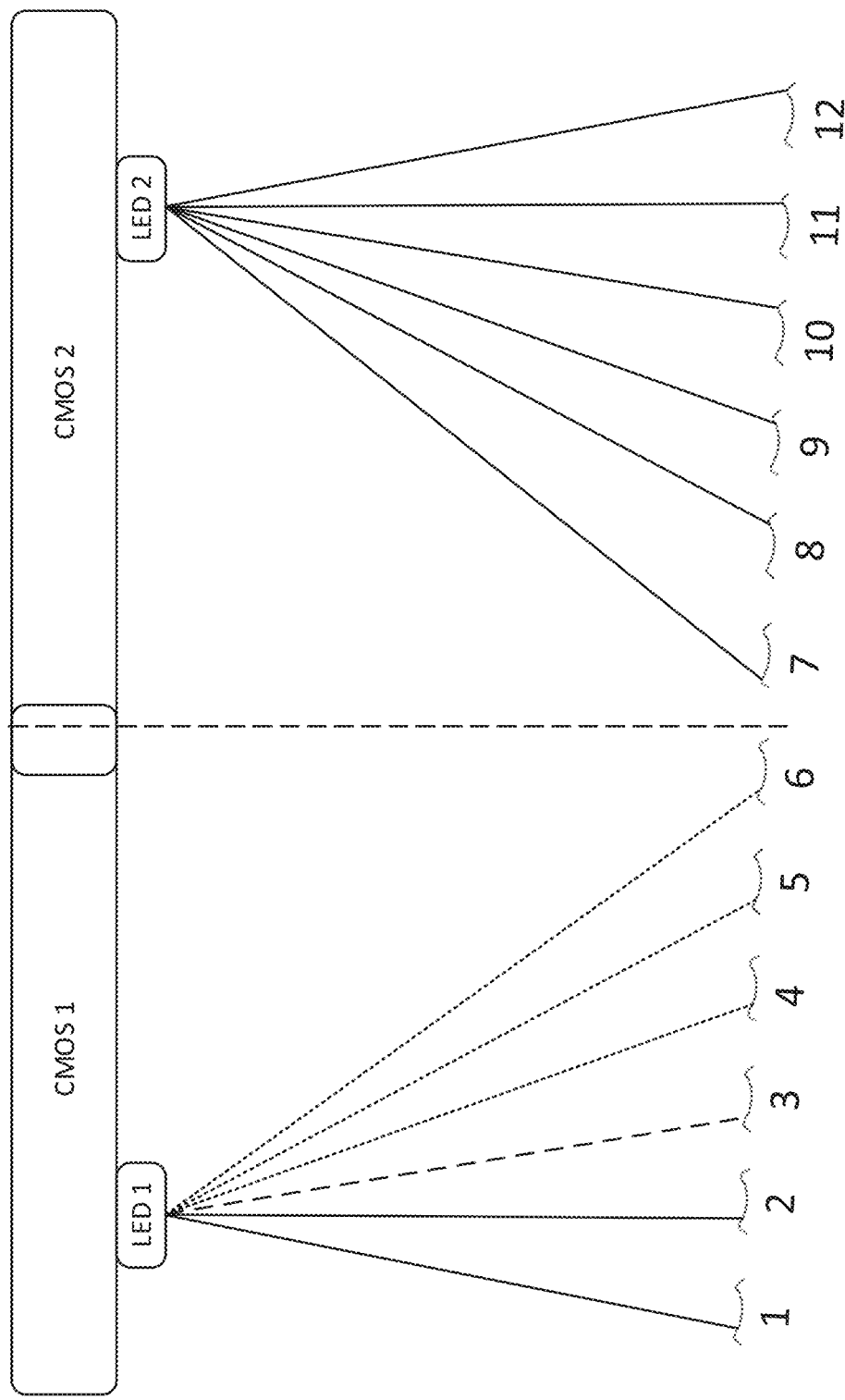
FIG. 13 is a schematic illustrating conditions favorable to generating the croissant-like shadow effect when the multi-fiber connector endface presents at a slight angle.

FIG. 13 is a schematic illustrating conditions favorable to generating the croissant-like shadow effect when the multi-fiber connector endface presents at a slight angle. FIG. 13 illustrates direct-illumination conditions wherein images are captured while activating the illumination source that is the most aligned with the region being captured. It is noted that FIG. 13 is a simplified schematic made only for the purpose of explaining the croissant-like shadow effect and is in no way made to scale. As illustrated in FIG. 13, the surface of typical multifiber connector endfaces are not flat. Connector polishing techniques often generate a slight depression in the optical fiber area (sometimes named "core dip"). This normal deformation can be caused by polishing operations applied on materials having different hardness. Depending on the light incidence on these irregular surfaces, more or less illumination light can be reflected in some areas, thereby causing shadow. This effect is amplified when the connector endface is presented with a slight angle (2.5 degrees for this example).

This explains the croissant-like shadow effect when the multifiber connector endface presents at a slight angle. In such conditions, the resulting illumination can improve in some areas of the endface (see, e.g., fibers #1, 7, 8, 9 and 10) and deteriorate in some other areas (see, e.g., fibers #3, 4, 5 and 6).

Figure 14:
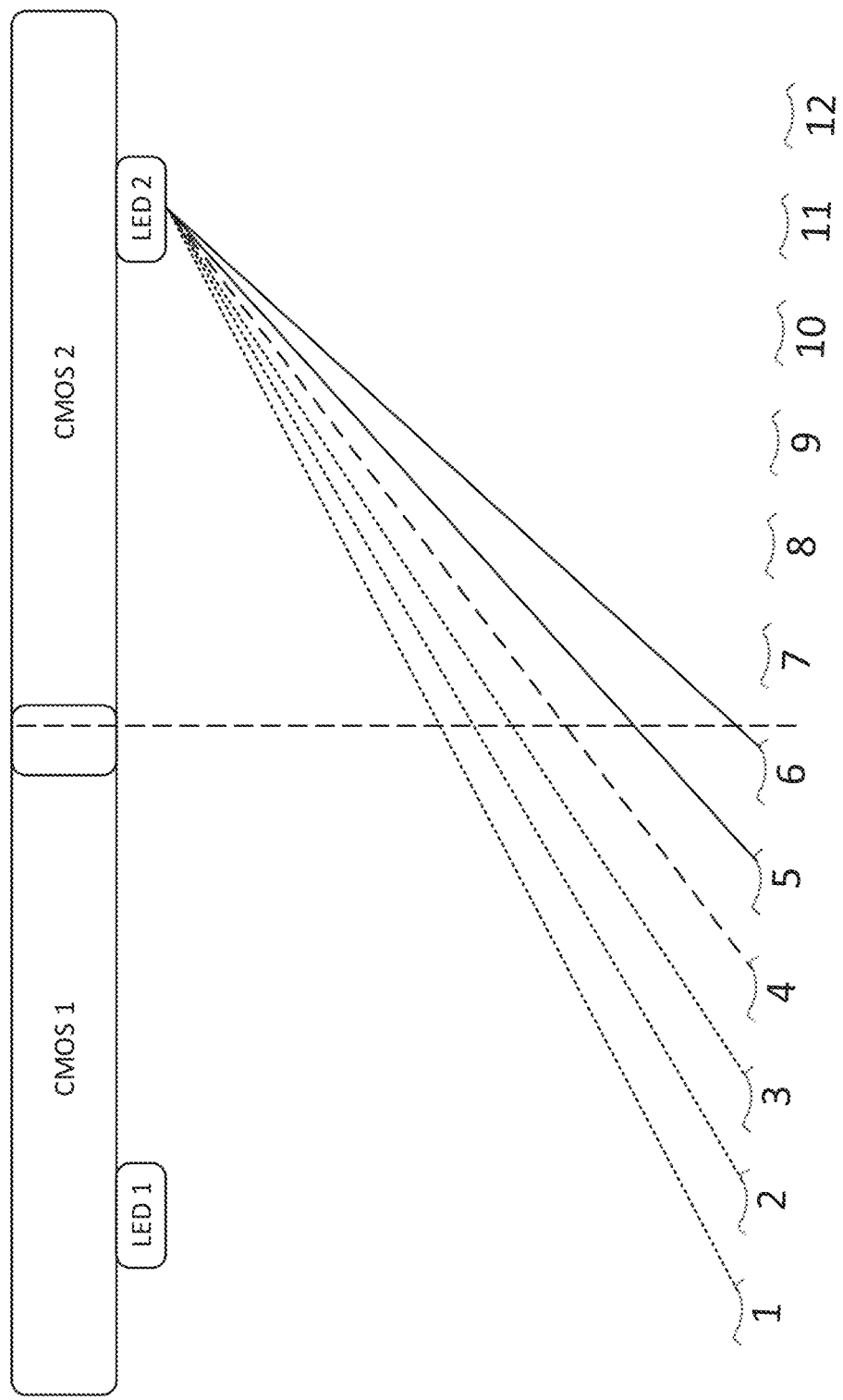
FIG. 14 is a schematic illustrating a cross-illumination technique where an image is captured while activating the illumination source that is opposite to the image detector used for the acquisition.

Now referring to FIG. 14, to illuminate this issue, there is proposed to capture images wherein the opposite illumination source is activated (cross-illumination). For each inspected region, at least two images may be captured (under direct-illumination and cross-illumination) and may then be made available to the inspection analysis software. For each region or for each optical fiber endface, the software may select which image to use for endface inspection analysis, i.e., the image showing the less shadow.

FIG. 14 is a schematic illustrating a cross-illumination technique where an image is captured while activating the illumination source that is opposite to the image detector used for the acquisition, i.e., the image is captured while activating an illumination source that is not the most aligned with the region being captured.

FIG. 15A is part of an image obtained with direct illumination and FIG. 15B is part of an image obtained with cross illumination, wherein both images show fibers 4, 5 and 6 of the same multifiber connector endface. It shows that, in this specific case, a cross illumination creates less shadows and therefore improves the image quality.

Therefore, in some embodiments, the inspection microscope may always capture both direct-illumination images and cross-illumination images, in sequence. From both direct-illumination images and the cross-illumination images, the inspection microscope may perform an illumination analysis on the captured images to select which image to use for endface inspection analysis. The selection can be made either for each individual optical fiber endface to be inspected or for each region over the connector endface.

In some other embodiments, the inspection microscope may first capture direct-illumination images only and perform an illumination analysis on the captured images. If a substantial croissant-like shadow is detected on at least one of the fibers of a multifiber connector (e.g., if the illumination analysis finds that the illuminated area is abnormally small), the system may automatically decide to capture additional cross-illumination images. For example, if (as in FIG. 13) fibers showing shadows are on the left side of the connector endface, the inspection microscope may turn off the left-side illumination source and activate the right-side illumination source (as in FIG. 14).

The endface inspection analysis software has then access to two images of the left-side region of the connector endface, i.e., a direct-illumination image and a cross-illumination image. For each individual fiber, the software may select which of the two images to use for endface inspection analysis. For example, in the case of FIGS. 13 and 14, the direct-illumination image may be selected for fibers #1, 2 and 3, and the cross-illumination image be selected for fiber #4, 5 and 6.

In the case of two image detectors and two illumination sources, up to four different images may be captured on the connector endface, i.e., direct and cross-illumination applied on both the left and right-side regions of the connector. For each individual fiber, the software may select which image to use for endface inspection analysis.

In some other embodiments, the software may further produce a frame by combining multiple images and even different portions of the captured images to create a single representation of the whole area of the connector endface.

It is noted that in the case of a single image detector, the inspection microscope may capture two images corresponding to each illumination sources, which are activated in sequence. From the two images, the inspection microscope may perform an illumination analysis on the captured images to select which image to use for endface inspection analysis. Again, the selection can be made either for each individual optical fiber endface to be inspected or for multiple regions over the connector endface.

Illumination Analysis

Figure 16C:
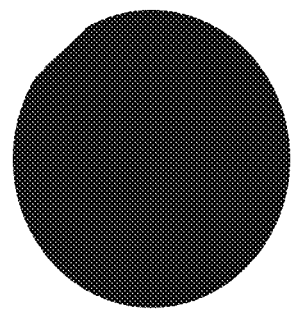
FIG. 16C illustrates the result of a convex hull algorithm part of an illumination analysis algorithm, in accordance with one embodiment.
Figure 16B:
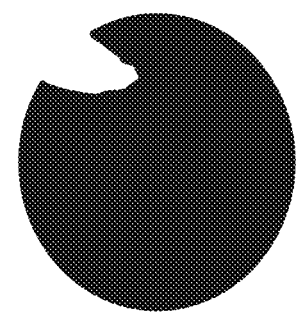
FIG. 16B illustrates the result of a connected component algorithm part of an illumination analysis algorithm.
Figure 16A:
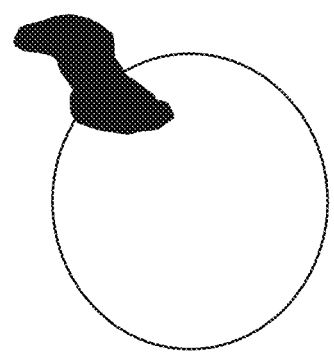
FIG. 16A illustrates a hypothetical image of an optical fiber endface.

An example embodiment of an illumination analysis algorithm is now described in more details with reference to FIGS. 16A, 16B and 16C. It should be noted that the illumination analysis algorithm is herein described only as an illustrative example only. Many variants of such algorithm are possible and can be used to implement the inspection microscope device.

The criteria for selecting which image to use for endface inspection analysis may rely on an evaluation of the size of the area over the optical fiber which is adequately illuminated for endface inspection analysis (herein referred to as the "illuminated area"). The image for which this illuminated area is the largest is selected.

FIG. 16A illustrates a hypothetical image of an optical fiber endface wherein a large defect overlaps the edge of the optical fiber endface area (white region). The illumination analysis may go as follows. First, the inspection image is analyzed to find the areas within the image which corresponds to individual optical fiber endfaces.

Then, a threshold is determined to find which pixel is adequately illuminated and which is not. In order to select the threshold, a histogram of the gray tones for the image pixels located in the area may calculated for each optical fiber endface area. The threshold may then be based, e.g., on an absolute grayscale value, a fixed delta relative to a maximum grayscale of the histogram (i.e., relative to the whitest pixel), Otsu's delimitation method or any combination of these methods.

As known in the art, Otsu's method may be used to find the threshold which minimizes the intra-class variance for two classes of pixels (well-lit and dark pixels). Otsu's method provides in general a good criterion, but it assumes the existence of two classes of pixels. If most or all of the pixels are well lit, the result may be wrong. It may therefore be advantageous to use a combination of methods for finding a proper threshold in order to avoid false detections or being too lenient for some edge cases.

Once the threshold is determined, it is applied to every pixel corresponding to the area of the optical fiber endface to generate a binary-selected pixels matrix.

A connected component algorithm may then be applied on this result in order to define one or more blobs of illuminated pixels within the area of the optical fiber endface. The largest blob found by this method is in general the portion of the fiber which is adequately illuminated for endface inspection analysis. However, there are some cases for which using only the largest blob may be problematic (e.g., if a large defect cuts the area of the optical fiber in two or more parts, only the largest area would be considered as the fiber). For more robust results, the second largest blob may also be considered. FIG. 16B illustrates the result of the connected component algorithm, wherein the black region illustrates the largest blob of illuminated pixels.

As shown in FIG. 16B where a large defect ingress inside the fiber, if the algorithm was to stop here, it would not make the difference between a badly illuminated section of the fiber and the large defect itself. A convex hull algorithm may then be applied. As known in the art, such convex hull algorithm finds the smallest convex set of coordinates which encompasses all the pixels of a given set. In our case, the initial set of points is one or more blobs of illuminated pixels and the output is the convex contour of these blobs as illustrated in FIG. 16C, which is found as the illuminated area. The portion of the large defect which is inside the area of the optical fiber endface is therefore properly included within this area which is found to be illuminated.

Once this algorithm is applied to the direct and cross-illumination images, the software may select which image to use for endface inspection analysis based on the size of the illuminated area. For example, if the image is selected individually for each optical fiber endface, the image showing the largest illuminated area may be selected. If the same image is selected for a plurality of optical fiber endfaces, the image may be selected, e.g., as the one which does not include the smallest illuminated area among all fibers.

Example of Inspection Microscope Device Architecture

Figure 17:
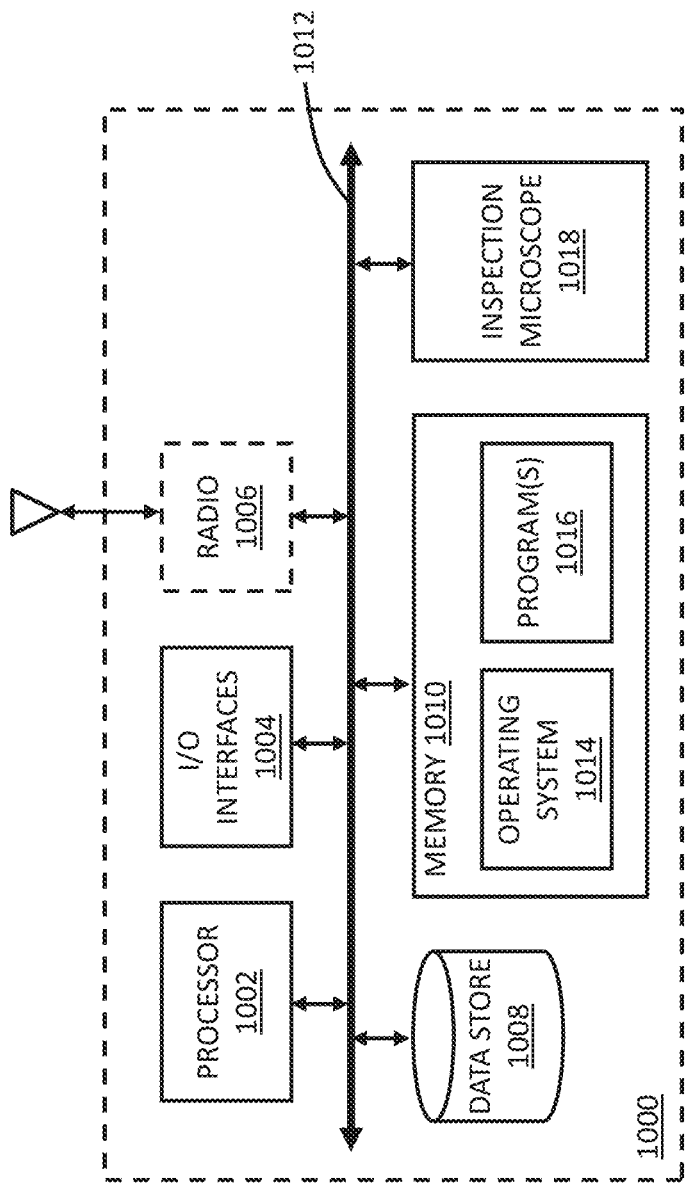
FIG. 17 is a block diagram of an inspection microscope device 1000 which may embody the inspection microscope system of FIG. 1.

FIG. 17 is a block diagram of an inspection microscope device 1000 which may embody the inspection microscope device 100 of FIG. 1. The inspection microscope device 1000 may comprise a digital device that, in terms of hardware architecture, generally includes a processor 1002, input/output (I/O) interfaces 1004, an optional radio 1006, a data store 1008, a memory 1010, as well as an optical test device including an inspection microscope 1018. It should be appreciated by those of ordinary skill in the art that FIG. 17 depicts the inspection microscope device 1000 in a simplified manner, and a practical embodiment may include additional components and suitably configured processing logic to support known or conventional operating features that are not described in detail herein. A local interface 1012 interconnects the major components. The local interface 1012 can be, for example, but not limited to, one or more buses or other wired or wireless connections, as is known in the art. The local interface 1012 can have additional elements, which are omitted for simplicity, such as controllers, buffers (caches), drivers, repeaters, and receivers, among many others, to enable communications. Further, the local interface 1012 may include address, control, and/or data connections to enable appropriate communications among the aforementioned components.

The processor 1002 is a hardware device for executing software instructions. The processor 1002 may comprise one or more processors, including central processing units (CPU), auxiliary processor(s) or generally any device for executing software instructions. When the inspection microscope device 1000 is in operation, the processor 1002 is configured to execute software stored within the memory 1010, to communicate data to and from the memory 1010, and to generally control operations of the inspection microscope device 1000 pursuant to the software instructions. The processor 1002 may implement a controller used to control the operation of the image detectors and illumination sources of the inspection microscope 1018 to capture images from each image detector in sequence while also activating the illumination sources in sequence. In an embodiment, the processor 1002 may include an optimized mobile processor such as optimized for power consumption and mobile applications. The I/O interfaces 1004 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like, via one or more LEDs or a set of LEDs, or via one or more buzzer or beepers, etc. The I/O interfaces 1004 can be used to display a graphical user interface (GUI) that enables a user to interact with the inspection microscope device 1000 and/or output at least one of the values derived by the inspection microscope analyzing software.

The radio 1006, if included, may enable wireless communication to an external access device or network. Any number of suitable wireless data communication protocols, techniques, or methodologies can be supported by the radio 1006, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); NarrowBand Internet of Things (NB-IoT); Long Term Evolution Machine Type Communication (LTE-M); magnetic induction; satellite data communication protocols; and any other protocols for wireless communication. The data store 1008 may be used to store data, such as inspection microscope images. The data store 1008 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 1008 may incorporate electronic, magnetic, optical, and/or other types of storage media.

The memory 1010 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 1010 may incorporate electronic, magnetic, optical, and/or other types of storage media. Note that the memory 1010 may have a distributed architecture, where various components are situated remotely from one another, but can be accessed by the processor 1002. The software in memory 1010 can include one or more computer programs, each of which includes an ordered listing of executable instructions for implementing logical functions. In the example of FIG. 17, the software in the memory 1010 includes a suitable operating system (O/S) 1014 and computer programs 1016. The operating system 1014 essentially controls the execution of other computer programs and provides scheduling, input-output control, file and data management, memory management, and communication control and related services. The program(s) 1016 may include various applications, add-ons, etc. configured to provide end-user functionality with the inspection microscope device 1000. For example, example programs 1016 may include a web browser to connect with a server for transferring inspection result data files, a dedicated inspection microscope application configured to control inspection microscope measurements by the inspection microscope 1018, set image acquisition parameters, analyze connector endface images obtained by the inspection microscope 1018 and display a GUI related to the inspection microscope device 1000.

It is noted that, in some embodiments, the I/O interfaces 1004 may be provided via a physically distinct mobile device (not shown), such as a handheld computer, a smartphone, a tablet computer, a laptop computer, a wearable computer or the like, e.g., communicatively coupled to the inspection microscope device 1000 via the radio 1006. In such cases, at least some of the programs 1016 may be located in a memory of such a mobile device, for execution by a processor of the physically distinct device. The mobile may then also include a radio and be used to transfer measurement data files toward a remote test application residing, e.g., on a server.

Figure 5:
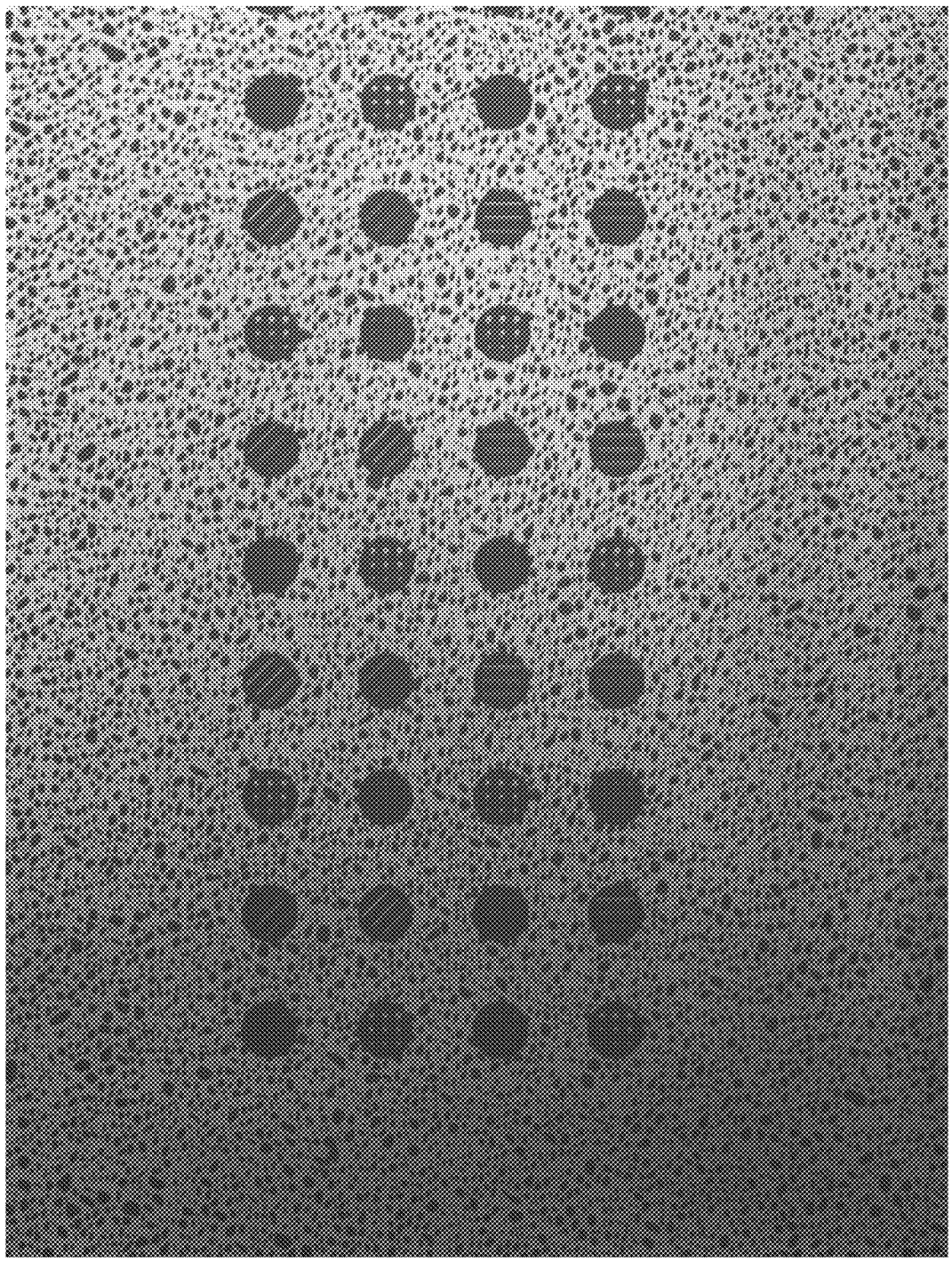
FIG. 5 is an image showing the effect of the overlap in the illumination zones of two sources. Here the left side of the image is darker than the right side.

It should be noted that the inspection microscope device shown in FIG. 5 is provided as an illustrative example only. Numerous types of computer systems are available and can be used to implement the inspection microscope device.

The embodiments described above are intended to be exemplary only. The scope of the invention is therefore intended to be limited solely by the appended claims.

The invention claimed is:

1. An optical-fiber connector endface inspection microscope system for inspecting an endface of an optical-fiber connector, the optical-fiber connector endface inspection microscope system comprising:
    an optical-fiber connector endface inspection microscope comprising at least one image detector for capturing images of the endface to be inspected;
    an illumination system comprising at least two illumination sources disposed so as to correspond to respective illumination regions over the connector endface to be inspected; and
    a controller configured to capture at least a first image while a first one of the illumination sources is activated and all adjacent illumination sources are deactivated; and to capture at least a second image while a second one of the illumination sources is activated and all adjacent illumination sources are deactivated; and
    a processing unit configured to analyze the first image and the second image to select, for each of a plurality of regions over the connector endface, one image among the first and the second image to use for endface inspection analysis.

2. The optical-fiber connector endface inspection microscope system as claimed in claim 1, wherein said processing unit is configured to analyze said first and second images and, for each individual optical fiber endface, select one image among the first and the second image to use for endface inspection analysis.

3. The optical-fiber connector endface inspection microscope system as claimed in claim 1, wherein the optical-fiber connector endface inspection microscope comprises at least two image detectors, the at least two image detectors being disposed so as to capture images of respective regions over the connector endface; and wherein said controller is configured to capture said first image using a first one of the image detectors and capture said second image using a second one of said image detectors.

4. The optical-fiber connector endface inspection microscope system as claimed in claim 3, wherein said first image and said second image are direct-illumination images wherein images are captured while activating the illumination source that is the most aligned with the region being captured.

5. The optical-fiber connector endface inspection microscope system as claimed in claim 4, wherein the controller is configured to further capture cross-illumination images wherein images are captured while activating an illumination source that is not the most aligned with the region being captured.

6. The optical-fiber connector endface inspection microscope system as claimed in claim 5, further comprising a processing unit configured to analyze the direct-illumination images and the cross-illumination images and, for each region over the connector endface, select one image among the first and the second image to use for endface inspection analysis.

7. The optical-fiber connector endface inspection microscope system as claimed in claim 5, further comprising a processing unit configured to analyze the direct-illumination images and the cross-illumination images and, for each individual optical fiber endface, select one image among the first and the second image to use for endface inspection analysis.

8. A method for inspecting an endface of an optical-fiber connector using an optical-fiber connector endface inspection microscope system, the method comprising:
    illuminating the connector endface using an illumination system comprising at least two illumination sources disposed so as to correspond to respective illumination regions over the connector endface to be inspected; and
    capturing images of the connector endface to be inspected using at least one image detector, wherein at least a first image is captured while a first one of the illumination sources is activated and all adjacent illumination sources are deactivated; and at least a second image is captured while a second one of the illumination sources is activated and all adjacent illumination sources are deactivated; and
    analyzing the first image and the second image to, for each of a plurality of regions over the connector endface, select one image among the first and the second image to use for endface inspection analysis.

9. The method as claimed in claim 8, wherein the one image to use for endface inspection analysis is selected for each individual optical fiber endface.

10. The method as claimed in claim 8, wherein the optical-fiber connector endface inspection microscope comprises at least two image detectors, the at least two image detectors being disposed so as to capture images of respective regions over the connector endface; and wherein said first image is captured using a first one of the image detectors and said second image is captured using a second one of said image detectors.

11. The method as claimed in claim 10, wherein said first image and said second image are direct-illumination images captured while the illumination source that is the most aligned with the region being captured is activated and all adjacent illumination sources are deactivated.

12. The method as claimed in claim 11, wherein said capturing further comprises capturing a first cross-illumination image while the illumination source that is the most aligned with the first region being captured is deactivated and one other illumination source is activated; and capturing the second cross-illumination image while the illumination source that is the most aligned with a second region being captured is deactivated and one other illumination source is activated.

13. The method as claimed in claim 12, further comprising analyzing the direct-illumination images and the cross-illumination images and, for each region over the connector endface, selecting one image among the first and the second image to use for endface inspection analysis.

14. The method as claimed in claim 12, further comprising analyzing the direct-illumination images and the cross-illumination images and, for each individual optical fiber endface to be inspected, selecting one image among the first and the second image to use for endface inspection analysis.

15. The optical-fiber connector endface inspection microscope system as claimed in claim 2, wherein said processing unit is further configured to:
- for each individual optical fiber endface, evaluate a size of an area over which the optical fiber endface is illuminated; and
- select one image among the first and the second image to use for endface inspection analysis as the image for which the size of the illuminated area is the largest.

16. The method as claimed in claim 9, further comprising:
- for each individual optical fiber endface, evaluating a size of an area over which the optical fiber endface is illuminated; and
- select one image among the first and the second image to use for endface inspection analysis as the image for which the size of the illuminated area is the largest.

\* \* \* \* \*